United States Patent [19]

Hope et al.

[11] 4,351,613

[45] Sep. 28, 1982

[54] TANKS FOR MIXING APPARATUS

[76] Inventors: Henry F. Hope; Stephen F. Hope, both of 2421 Wyandotte Rd., Willow Grove, Pa. 19090

[21] Appl. No.: 166,471

[22] Filed: Jul. 7, 1980

Related U.S. Application Data

[63] Continuation-in-part of Ser. No. 119,759, Feb. 18, 1980, Pat. No. 4,332,483.

[51] Int. Cl.³ .............................................. B01F 5/06
[52] U.S. Cl. ................................... 366/337; 220/22.3; 220/22
[58] Field of Search ............... 366/337, 336, 338, 340, 366/341, 339; 220/22.3, 22; 138/38, 42

[56] References Cited

U.S. PATENT DOCUMENTS

| | | | |
|---|---|---|---|
| 2,081,078 | 5/1937 | Watson | 220/22.3 |
| 2,345,554 | 4/1944 | Burdett | 366/337 |
| 3,620,506 | 11/1971 | Stephen | 366/337 |
| 3,799,509 | 3/1974 | Bydal | 366/338 |

FOREIGN PATENT DOCUMENTS 123463  2/1919  United Kingdom ................ 366/338

*Primary Examiner*—Robert W. Jenkins

*Attorney, Agent, or Firm*—Zachary T. Wobensmith, 2nd; Zachary T. Wobensmith, III

[57] ABSTRACT

Tanks for mixing apparatus are described in which one or more chemical materials are to be incorporated in a carrier liquid, which may be a solvent, such as water, and which is quantitatively predominant, some of the chemical materials being incompatible if brought together directly, or in a wrong sequence, or which are difficult to combine, the materials preferably being combined in the desired proportions in a cascaded arrangement of liquid filled chambers, the respective materials in the desired proportions preferably being supplied from separate sources of materials by pumps, the delivery of the carrier liquid being to a first mixing chamber in the tank to which a first chemical material is supplied, additional and successive mixing chambers being provided, if desired, the tanks being constructed of synthetic plastic material molded to provide a body to receive partition walls for attachment to the body, and a cover preferably transparent and molded to receive the partition walls, the cover preferably having fluid connections thereon for fluid and chemical material supply, for agitation of the liquid in the chambers for mixing for delivery of the mixed materials for use. Improved methods of making the tanks are also disclosed.

23 Claims, 5 Drawing Figures

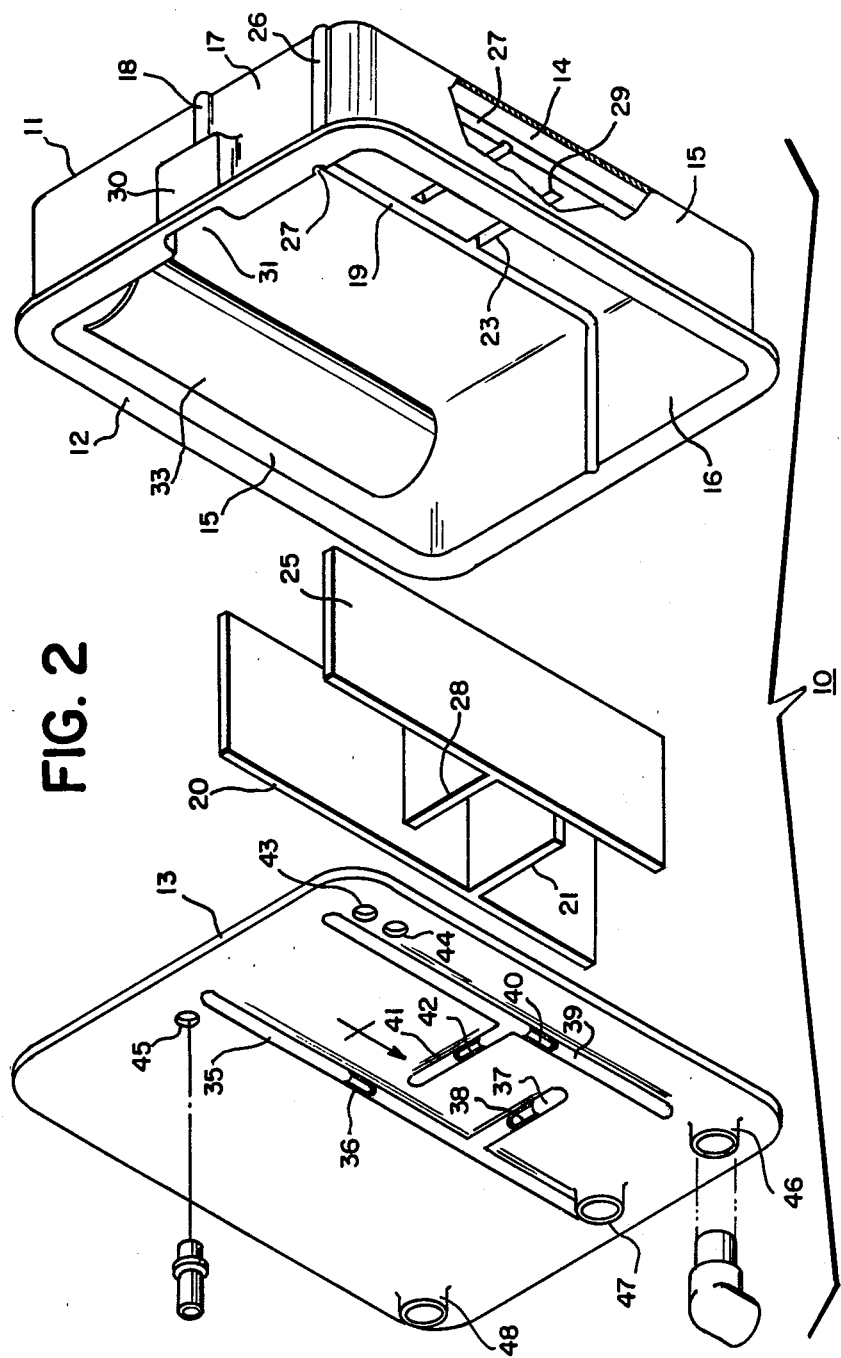

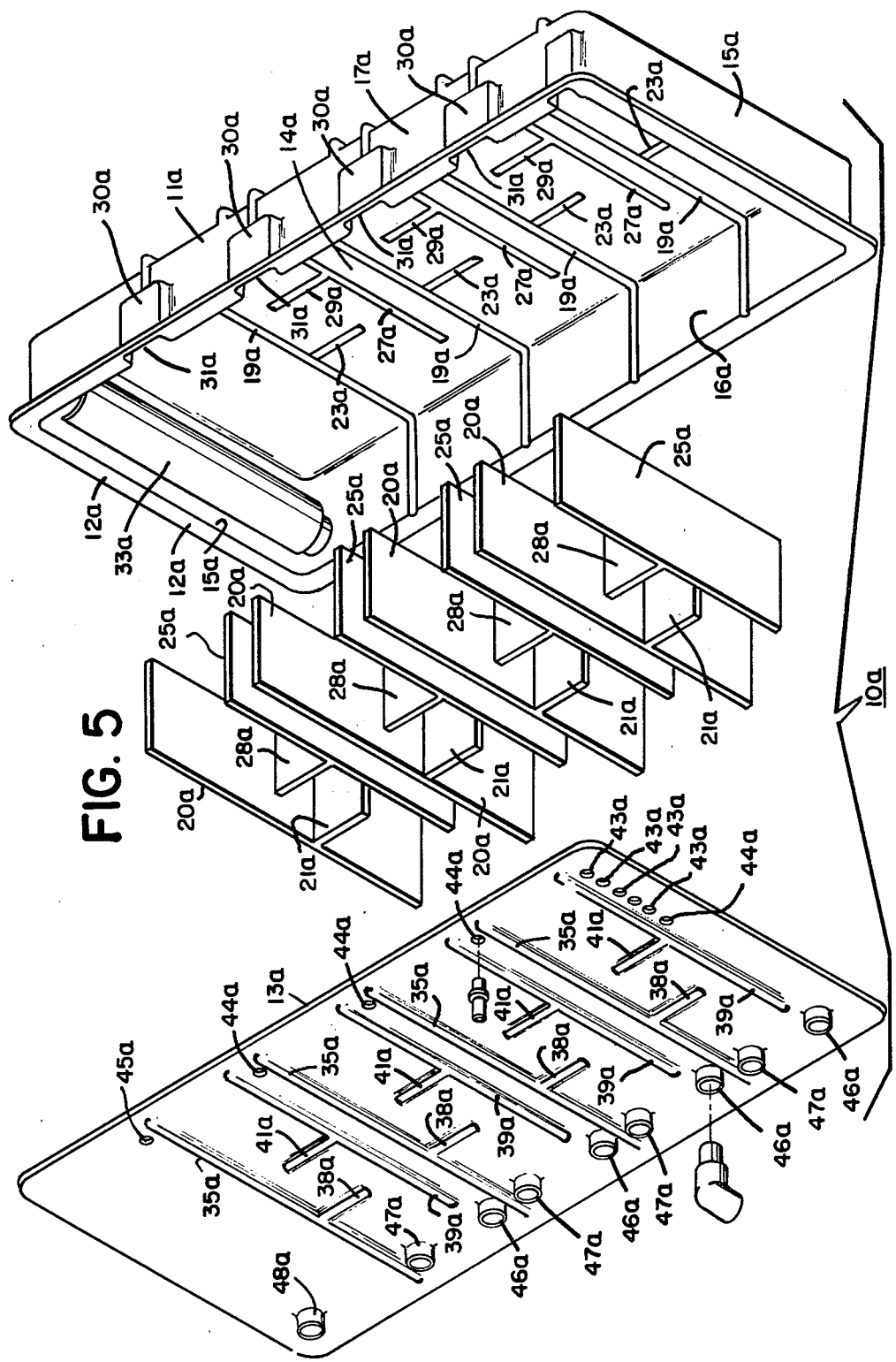

TANKS FOR MIXING APPARATUS

CROSS REFERENCE TO RELATED APPLICATION

This application is a continuation in part of our prior application for Mixing Apparatus, filed Feb. 18, 1980, Ser. No. 119,759, now U.S. Pat. No. 4,332,483.

BACKGROUND OF THE INVENTION

1. Field of the Invention

This invention relates to tanks for mixing apparatus for a plurality of different liquid materials and improved methods of making the same.

2. Description of the Prior Art

It has heretofore been proposed, as shown in our prior application for Mixing Apparatus filed Feb. 18, 1980, Ser. No. 119,759, to provide tanks with flat enclosing walls and with inserted partition walls secured in place by adhesives. The construction of such tanks is time consuming and costly.

SUMMARY OF THE INVENTION

In accordance with the invention tanks for mixing apparatus are provided together with methods of making the same, for successively adding chemical materials to a carrier liquid, such as water, which may be a solvent and which is the predominant quantitative material and particularly where some of the chemical materials may be incompatible, in a cascaded arrangement of successive liquid filled chambers in series in a closed tank, the respective chemical materials preferably being separately supplied in the desired proportions by pumps, the delivery of the carrier liquid being to a first mixing chamber to which the first chemical in the tank material is supplied, additional and successive mixing chambers being provided, if desired, the tanks being constructed of synthetic plastic material molded to provide a body to receive partition walls for attachment to the body, and a molded cover, preferably transparent and molded to receive the partition walls and preferably having fluid connections thereon for fluid and chemical material supply, for agitation of the liquid in the chambers for mixing, and for delivery of the mixed materials for use.

It is the principal object of the invention to provide tanks for mixing apparatus for chemical materials to be added to a carrier liquid which are simple in construction and free of complications which add to the difficulty of assembly and cost.

It is a further object of the invention to provide tanks for mixing systems which are simple in construction so as to reduce operating problems.

It is a further object of the invention to provide tanks for mixing apparatus in which the components are simple in construction and easy to assemble.

It is a further object of the invention to provide a closed tank having one or more mixing chambers therein separated by partitions mounted in the body of the tank and carried in part by a front transparent wall of the tank.

It is a further object of the invention to provide a closed tank having one or more mixing chambers and a storage chamber therein separated by partitions.

It is a further object of the invention to provide improved methods for making tanks for mixing apparatus.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 2 is an exploded perspective view of the tank of FIG. 1;

FIG. 5 is an exploded perspective view of the tank of FIG. 4.

It should, of course, be understood that the description and drawings herein are illustrative merely and that various modifications and changes can be made in the structure and methods disclosed without departing from the spirit of the invention.

Like numerals refer to like parts throughout the several views.

DESCRIPTION OF PREFERRED EMBODIMENTS

Figure 1:
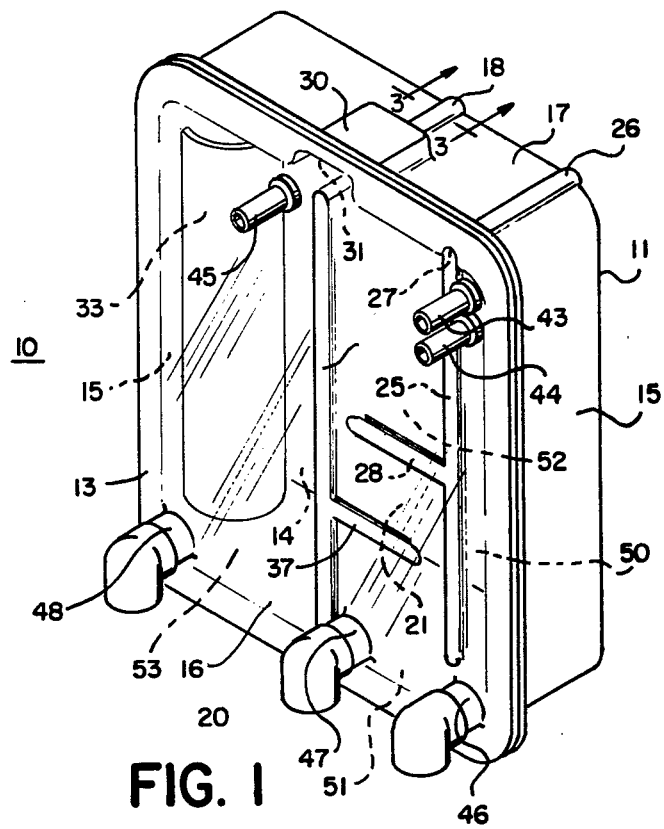
FIG. 1 is a view in perspective of a tank in accordance with the invention.
Figure 3:
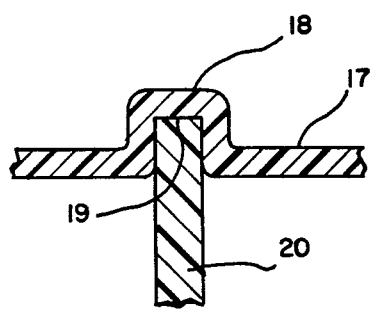
FIG. 3 is an enlarged fragmentary sectional view taken approximately on the line 3—3 of FIG. 1 and showing the manner of mounting of one of the partition walls.

Referring now more particularly to FIGS. 1, 2, and 3 of the drawings in which one preferred embodiment of the invention is illustrated, the tank 10 there shown includes a body portion 11 having an outwardly extending peripheral flange 12, and a vertical front cover 13, preferably of transparent material so that the action in the interior can be observed, in overlapping relation to and secured to the flange 12. The cover 13 is preferably held in fluid tight relation to the flange 12, such as by an interposed adhesive adherent to the flange 12 and the adjacent part of the cover 13.

The body portion 11 of the tank preferably includes a vertical wall portion 14, vertical side wall portions 15, a horizontal bottom wall portion 16 and a horizontal top wall portion 17. The wall portions 14, 15, 16 and 17 and cover 13 are preferably molded of synthetic plastic material which is non-corrosive and adequately resistant to the materials to be mixed in the tank 10. The horizontal top wall portion 17, the vertical wall portion 14 and the bottom wall portion 16 are preferably provided with an outwardly extending rib 18 (See FIG. 3) to provide a continuous interior slot 19 for the reception and retention of the marginal edges of a partition wall 20, the marginal edges of the wall 20 preferably being secured in the slot 19 by a suitable adhesive which is resistant to the chemicals to be mixed in the tank.

The vertical partition wall 20 preferably has a horizontal partition wall 21 secured thereto and extending therefrom which extends into a horizontal slot 23, in a rib (not shown) similar to the rib 18, the slot 23 being on the inner face of the wall portion 14.

A vertical partition wall 25 is provided in spaced relation to the partition wall 20 and to one of the side walls 15 and an outwardly extending rib 26, similar to the rib 18, is provided having a continuous interior slot 27 in the top wall portion 17 and downwardly along the wall portion 14. The partition wall 25 is terminated in spaced relation to the bottom wall 16 for liquid delivery around its lower edge. The partition wall 25 may also be provided with a horizontal partition wall 28, spaced above the partition wall 23 and received in a slot 29 in a rib (not shown) similar to the rib 18 to provide a tortuous path below the top margins of the partition walls 22 and 25 and between the horizontal partitions 21 and 28.

The horizontal top wall portion 17 is also provided with an integral struck out portion 30 to provide an interior passageway 31 for liquid communication over the top of and beyond the partition 20 and which prevents return of liquid if the level to the right of the partition 20 should fall.

A vertical guide tube 33 is provided contiguous to the junction of the other of the side wall portion 15 and the vertical wall portion 14 and terminating in spaced relation to the bottom wall 16 and top wall 17 for the reception of a float (not shown) for control purposes but which is described in our prior application Ser. No. 119,759, now U.S. Pat. No. 4,332,483, and previously referred to.

The cover 13 is provided with a vertical outwardly extending rib 35, similar to the rib 18, to provide an interior slot 36 for the reception and retention of the outer vertical edge of the partition 20, and an outwardly extending horizontal rib 37, extending from the rib 35, and with a slot 38 therein for reception and retention of the partition wall 21.

The cover 13 is also provided with a vertical outwardly extending rib 39 with a slot 40 therein for reception and retention of the outer vertical edge of the partition wall 25, and an outwardly extending horizontal rib 41 with a slot 42 therein for reception and retention of the wall 28.

The cover 13 is also provided with upper and lower fluid supply openings 43 and 44 for delivery of a measured quantity of the carrier liquid, such as water, and of a chemical material to be added and mixed with the carrier liquid.

The cover 13, in communication with the interior passageway 31 preferably has a fluid connection 45 for communication with an expansible chamber, such as a bag (not shown) for the delivery and return of entrapped gas or vapor when the level beyond the partition wall rises and for the return of the entrapped gas or vapor when the level falls.

Fluid connections 46 and 47 are also provided on the cover 13 for withdrawal and return of liquid for agitation to aid in the mixing, the fluid connections 46 and 47 being connected to a pump (not shown).

A fluid delivery connection 48 is also provided for withdrawal of the mixed liquid for use.

Figure 4:
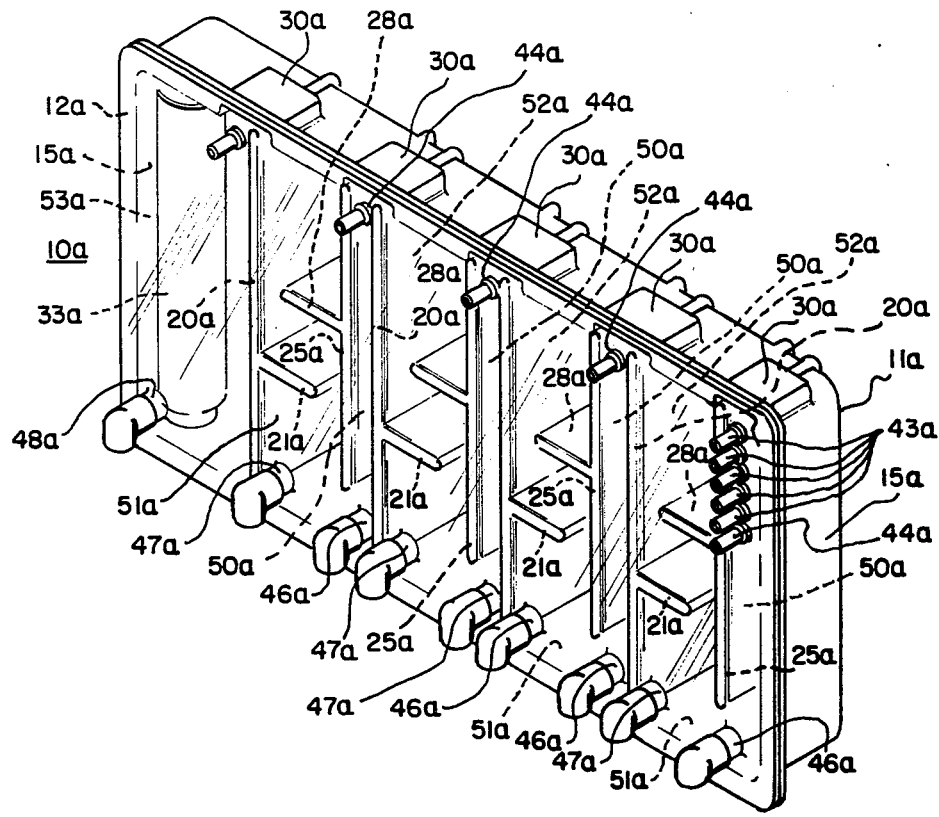
FIG. 4 is a view in perspective of a multiple compartment mixing tank in accordance with the invention.

Referring now more particularly to FIGS. 4 and 5 of the drawings another preferred embodiment of the tank of the present invention is illustrated for mixing a plurality of different chemicals, some of which may be incompatible or difficult to mix.

The tank 10a there shown includes a body portion 11a, preferably molded of a suitable synthetic plastic, having a peripheral flange 12a and a vertical front cover 13a as before secured to the flange 12a in fluid tight relation.

The body portion 11a has a vertical wall portion 14a, vertical side wall portions 15a, a horizontal bottom wall portion 16a and a horizontal top wall portion 17a.

The body portion 11a is provided with a plurality of outwardly extending ribs 18a with slots 19a, similar to the rib 18 and its slot 19 for the reception and retention of the marginal edges of partition walls 20a the marginal edges of the walls 20a preferably being secured in the slots 19a by a suitable adhesive which is resistant to the chemicals to be mixed in the tank.

The vertical partition walls 20a preferably each has a horizontal partition wall 21a secured thereto and extending therefrom which extends into a horizontal slot 23a, in a rib (not shown) similar to the rib 18, the slot 23a being on the inner faces of the wall portion 14.

Vertical partition walls 25a are provided in spaced relation to the partition walls 20a and to one of the side walls 15a and outwardly extending ribs 26a, similar to the ribs 20a, are provided having continuous interior slots 27a in the top wall portion 17a and downwardly along the wall portion 14a. The partition wall 25a is terminated in spaced relation to the bottom wall 16a for liquid delivery around its lower edge. The partition walls 25a may also be provided with horizontal partition walls 28a spaced above the partition wall 23a and received in slots 29a in a rib (not shown) similar to the ribs 18a to provide tortuous paths below the top margins of the partition walls 22a and 25a and between the horizontal partitions 21a and 28a.

The horizontal top wall portion 17a is also provided with integral struck out portions 30a to provide interior passageways 31a for liquid communication over the top of and beyond the partitions 20a and which prevent the return of liquid if the level to the right of any of the partitions 20a should fall.

A vertical guide tube 33a is provided contiguous to the junction of the other of the side wall portion 15a and the vertical wall portion 14a and terminating in spaced relation to the bottom wall 16a and top wall 17a for the reception of a float (not shown) for control purposes but which is described in our prior application Ser. No. 119,759, and previously referred to.

The cover 13a is provided with vertical outwardly extending ribs 35a, similar to the ribs 18a, to provide an interior slot 36a for the reception and retention of the outer vertical edge of the partition and an outwardly extending horizontal rib 37a, extending from the rib 35a, and with a slot 38a therein for reception and retention of the partition wall 21.

The cover 13a is also provided with vertical outwardly extending ribs 39a with slots 40a therein for reception and retention of the outer vertical edge of the partition walls 25a, and outwardly extending horizontal ribs 41a with slots 42a therein for reception and retention of the walls 28a.

The cover 13 is also provided with upper and lower fluid supply openings 43a and 44a for delivery of a measured quantity of the carrier liquid, such as water, and of a chemical material to be added and mixed with the carrier liquid.

The cover 13a, in communication with the interior passageway 31a preferably has a fluid connection 45a for communication with an expansible chamber, such as a bag (not shown) for the delivery and return of entrapped gas or vapor when the level beyond the partitional wall rises and for the return of the entrapped gas or vapor when the level falls.

Fluid connections 46a and 47a are also provided on the cover 13a for withdrawal and return of liquid for agitation to aid in the mixing, the fluid connections 46a and 47a being connected to a pump (not shown).

A fluid delivery connection 48a is also provided for withdrawal of the mixed liquid for use.

It will be noted that in FIGS. 1 and 2 a component introduction space is provided at 50, with a mixing space at 51, a mixing and transfer space at 52 and a storage space at 53. Similarly, as shown in FIGS. 4 and 5 a plurality of component introduction spaces are provided at 50a, with mixing spaces at 51a, mixing and transfer spaces at 52a and a storage space at 53a.

The preferred methods of constructing the tanks 10 and 10a heretofore described will now be described.

Each of the body portions 11 and 11a of the tanks 10 and 10a are preferably molded from a suitable synthetic plastic with the ribs 18, 26, or 18a, 26a, and the like formed to provide the slots 19, 23, 27 and 29, or 19a, 23a, 27a and 29a and the struck out portions 30 and interior passageways 31, or the corresponding struck out portions 30a and interior passageways 31a, formed in the body portion 11 or 11a.

The vertical guide tubes 33 or 33a are then secured in position.

The cover 13 or 13a is also molded to provide the ribs 35, 37, 39 and 41 or the ribs 35a, 37a, 39a and 41a with the bosses 46, 47 and 48 or the bosses 46a, 47a and 48a molded thereon or integrally connected. The holes 43, 44 and 45 and the holes 43a, 44a and 45a are molded or drilled for attachment of pipes for fluid supply.

The cover 13 or 13a is secured to the flange 12 or 12a and the tank 10 or 10a is ready for use.

We claim:

1. A tank for mixing apparatus for at least one chemical material to be incorporated in a carrier liquid comprising
a molded unitary body portion having a first vertical side wall portion, integral second opposite spaced vertical side wall portions extending from said first vertical side wall portion, integral third horizontal opposite spaced side wall portions extending from said first side wall portion and joined at their ends to the ends of said second vertical side wall portions,
said body portion having a peripheral flange extending from said second and third side wall portions and parallel to said first side wall portion,
a vertical cover closing said body portion and in engagement with said peripheral flange,
said integral third horizontal side wall portions including a top wall,
partition members in engagement with said first vertical side wall portion and said vertical cover,
said partition members separating the interior of the body portion into a plurality of communicating spaces at least one of which is for component introduction, at least one of which is for mixing, and another of which is for storage of mixed material,
means for introducing into said space for component introduction a carrier liquid and at least one chemical to be added,
said top wall portion having a struck out portion providing a space into which one of said partition members extends for preventing return of fluid.

2. A tank as defined in claim 1 in which said cover has fluid connections for delivery of component fluids into said space for mixing and a fluid discharge connection.

3. A tank as defined in claim 1 in which said cover has a plurality of ribs with internal grooves for the reception of marginal edges of said partition members.

4. A tank as defined in claim 1 in which said cover is transparent.

5. A tank as defined in claim 1 in which said body portion has a plurality of ribs with internal grooves for the reception of marginal edges of said partition members.

6. A tank as defined in claim 1 in which said first side wall portion is vertically disposed,
said second side wall portions are vertically disposed to provide vertical side wall portions,
said third side wall portions are horizontally disposed to provide top and bottom wall portions, and
said cover is vertically disposed.

7. A tank as defined in claim 1 in which means is provided on said top wall portion comprising a fluid transfer space above one of said partition members for preventing return flow of fluid.

8. A tank as defined in claim 1 in which said top wall portion has a struck out portion providing a space for fluid transfer over a partition member separating said mixing space from said storage space.

9. A tank as defined in claim 1 in which members are provided for aiding in agitating the fluid in said mixing space.

10. A tank as defined in claim 1 in which said mixing space has fluid connections communicating therewith for withdrawal and return of fluid for mixing.

11. A tank as defined in claim 10 in which said fluid connections are provided on said cover.

12. A tank as defined in claim 1 in which said partition members include a first partition member forming a boundary for the space for component introduction and a second partition member forming with said first partition member boundaries of the space for mixing.

13. A tank as defined in claim 1 in which said first partition member forms a boundary for the space for storage.

14. A tank as defined in claim 1 in which said partition members include a plurality of spaced partition members each separating the interior of the body portion into a plurality of spaces for component introduction, a plurality of spaces for mixing, and a space for storage of mixed fluid,
means for introducing into said spaces for component introduction a carrier liquid, and means for successively introducing into said spaces for component introduction a plurality of chemicals to be added.

15. A tank as defined in claim 14 in which said cover has a plurality of ribs with internal grooves for reception of marginal edges of said partition members.

16. A tank as defined in claim 14 in which said plurality of partition members provide communicating upper and lower mixing spaces.

17. A tank as defined in claim 14 in which members are provided for aiding in agitating the fluid in said mixing spaces.

18. A tank as defined in claim 14 in which said mixing spaces have fluid connections communicating therewith for withdrawal and return of fluid for mixing.

19. A tank as defined in claim 18 in which said fluid connections are provided on said cover.

20. A tank as defined in claim 14 in which said partition members each includes a plurality of first partition walls extending from said top wall portion to said bottom wall portion and a plurality of second partition walls spaced from said first partition walls and extending downwardly from said top wall portion in spaced relation from said bottom wall portion, a horizontal wall extending from the partition wall of at least one of said pluralities and terminating in spaced relation to the partition wall of the other of said pluralities, the space below said horizontal partition walls providing a mixing space, an interior passageway above said first partition wall for transfer of liquid thereabove, the second partition walls being spaced from the first partition walls for introduction of an additional component thereinto for mixing, and fluid connections communicating with the spaces between said second and first partition walls.

21. A tank as defined in claim 14 in which means is provided on said top wall portion comprising fluid transfer spaces above one of said partition members for preventing return flow of fluid.

22. A tank as defined in claim 14 in which said top wall portion has a plurality of struck out portions providing spaces for fluid transfer over a partition member bounding a mixing space.

23. A tank as defined in claim 14 in which said body portion has a plurality of ribs with internal grooves for the reception of marginal edges of said partition members.

* * * * *